UNITED STATES PATENT OFFICE.

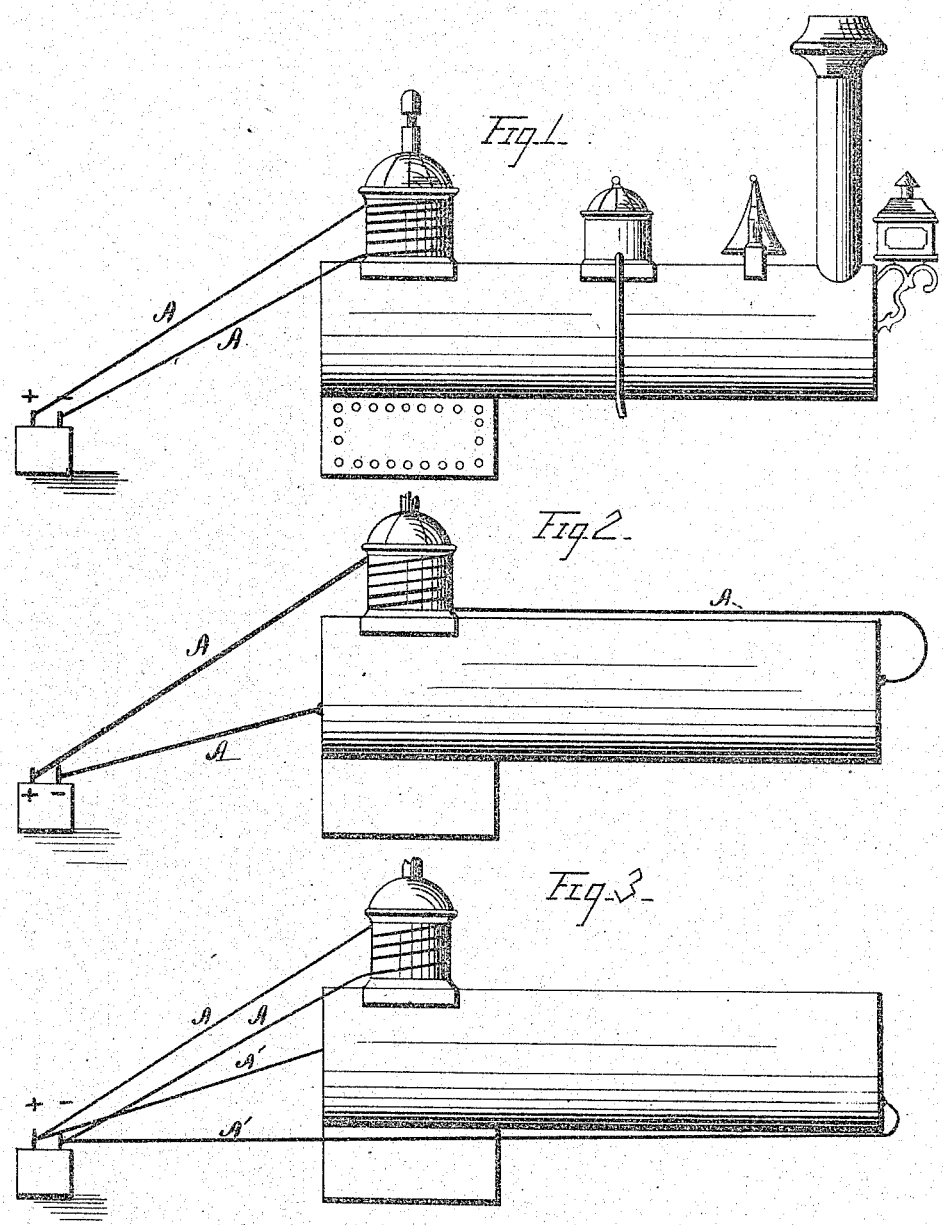

ABRAHAM T. HAY, OF BURLINGTON, IOWA.

IMPROVEMENT IN ELECTRICAL PROTECTION FOR BOILERS.

Specification forming part of Letters Patent No. 140,196, dated June 24, 1873; application filed February 14, 1873.

*To all whom it may concern:*

Be it known that I, ABRAHAM T. HAY, of Burlington, in the county of Des Moines and State of Iowa, have invented certain new and useful Improvements in Method of Preventing Incrustation or Scale, &c.; and I do hereby declare the following to be a full, clear, and exact description of the invention, such as will enable others skilled in the art to which it pertains to make and use it, reference being had to the accompanying drawings which form part of this specification.

My invention relates to new applications of electricity for the purpose of removing scale or incrustation from steam-boilers, &c.

In the drawings, Figure 1 is a view of a boiler having a wire, A, coiled about its dome, and the latter having its two ends terminating at the two poles of an external battery. Fig. 2 is a similar view, in which one end of the wire A, instead of passing directly from the dome to the battery, is connected with one end of the boiler, and then passes from the other end of the boiler to the battery, making the boiler a part of a closed circuit. Fig. 3 is a view of the boiler wherein the wire A passes directly from the battery to the dome and back to the battery; and also another wire, A', which passes directly from the battery to the end of the boiler, and back from the other end thereof to the battery.

I have found that all incrustation or scale or adhesion of the particles of matter held in solution in any receptacle to the sides of the vessel in which they are contained is the direct product of electro-chemical action; and it does not matter what the relation may be, whether cakes in a griddle-pan, bread in a baking-pan, sugar, salt, or other substances in their evaporating-vats, the relation in all cases being the same, wherein, through the action of heat in any degree, the substance is evaporated or its condition altered; and the relation is exactly the same in the case of an object immersed in the solution as it is when the solution is contained in the object—thus, in the case of mineral deposits and deposits of other substances upon the metal hulls or sheathing of sea-vessels. This electro-chemical condition I have found to be the same as exists in the electroplating vat. In the latter there must exist a chemical solution, motion among the particles, a certain degree of heat, currents of electricity, and there must be two poles or electrodes in contact with the fluid substance. So, in order that a hard scale or crust may form upon the surfaces, as in any of the cases above cited, for instance, there must always be five conditions present, viz., chemical, dynamic, thermic, electrical, and magnetic. Dispense with any one of these, and all hard deposit is prevented. Thus, in a steam-boiler, generally, the bottom scale is of a porous nature, while along the upper plates and among the flues it is of very hard and compact form. This arises from the fact that all water contains certain mineral salts in solution, and other impurities in suspension. The suspended particles fall by their own gravity, and prevent or interrupt a regular formation of crystalline deposit or scale, while the upper plates are free to have them electroplated thereon.

The electrical conditions may be dispensed with by causing counter-currents to be sent through the receptacle, in a direction contrary to its natural or earth currents, of such intensity as to neutralize these currents. But local causes, such as mineral solvents held in the substance, or particles held in suspension, proximity to metalliferous deposits, &c., all tend to alter these earth or natural currents, both in direction and intensity, so that it is difficult to determine what intensity is required to neutralize them.

I propose therefore to dispense with the magnetic or polar conditions, for without two poles or electrodes in contact with the fluid substance, there can be no electro-chemical adhesion. I effect this as follows: Around the dome, (of a locomotive boiler, for instance,) the smoke-stack, or any other metallic core which is so firmly and intimately fastened to the exterior of the receptacle as to form a part of it I coil a helix of insulated wire, A, terminating its two ends at the two poles of an electrical battery. I now pass a current of electricity through the wire, and the core is instantly changed into a magnet with a neutral point, or point of no variation to the magnetic needle, somewhere within the limits covered by the helix. Now, if the relation between this core and the receptacle, whatever it may be, is so intimate that the two form a single piece, or have but one magnetic condition, it is evident that the exterior end of the core will be, say, negative, and all that portion beyond the neutral point, including the receptacle itself, will be positive. Thus, there are no longer two poles in contact with the fluid substance, and there can, therefore, be no action from the exterior pole toward the receptacle; but the receptacle, having its surfaces still in contact with the fluid substance, will give off its scale and attempt to deposit it upon the exterior pole; but not being able to reach this pole of an opposite state the solution will soon become saturated, and the salts will be precipitated below, into a friable mass, and can easily be washed away with the hydrant, and the receptacle will soon be left clean and bright.

I do not limit myself to a single coil about the dome or core, nor to any particular positions of the coils. They may be superposed upon each other, placed side by side along the core, or in any other suitable manner. Neither do I confine myself to a single battery or device for generating electricity. I propose sometimes to use separate batteries for the separate wires.

I propose also, at times, to combine the coil with a direct or closed circuit, through the boiler or other receptacle, by starting a wire from the battery, coil it about the core, and, after passing off, to connect it with one end of the receptacle, uniting the other end of the receptacle, with the other pole of the battery by a wire, thus making the receptacle to form a part of a closed circuit; or they may be combined as follows: By coiling the helix, as in the first instance, and connecting both ends thereof with the battery direct, and forming the closed circuit with the boiler by means of another wire which does not pass around the core at all. In the case of a sea-vessel, the coil may pass around any portion of the metal sheathing that does not come in contact with the water, so that that portion which is always submerged may possess but one polarity, or it may pass around any core which is a part of the metal sheathing, and is removed from the water.

Having thus described my invention, what I claim as new, and desire to secure by Letters Patent, is—

1. For the removal of crustation, scale, or solid deposit, the magnetization of a boiler or other receptacle by means of a coil upon a core removed from contact with the fluid, applied in the manner and for the purposes substantially as described.

2. In combination with the coil, the direct circuit through the boiler or other receptacle, as and for the purposes substantially as described.

In testimony that I claim the foregoing, I have hereunto set my hand this 13th day of January, 1873.

ABRAHAM T. HAY.

Witnesses:
MARK S. FOOTE,
R. SPENCER.